April 17, 1928.
A. O. CRAVIN
1,666,556
GAUGE
Filed Dec. 29, 1925
4 Sheets-Sheet 1
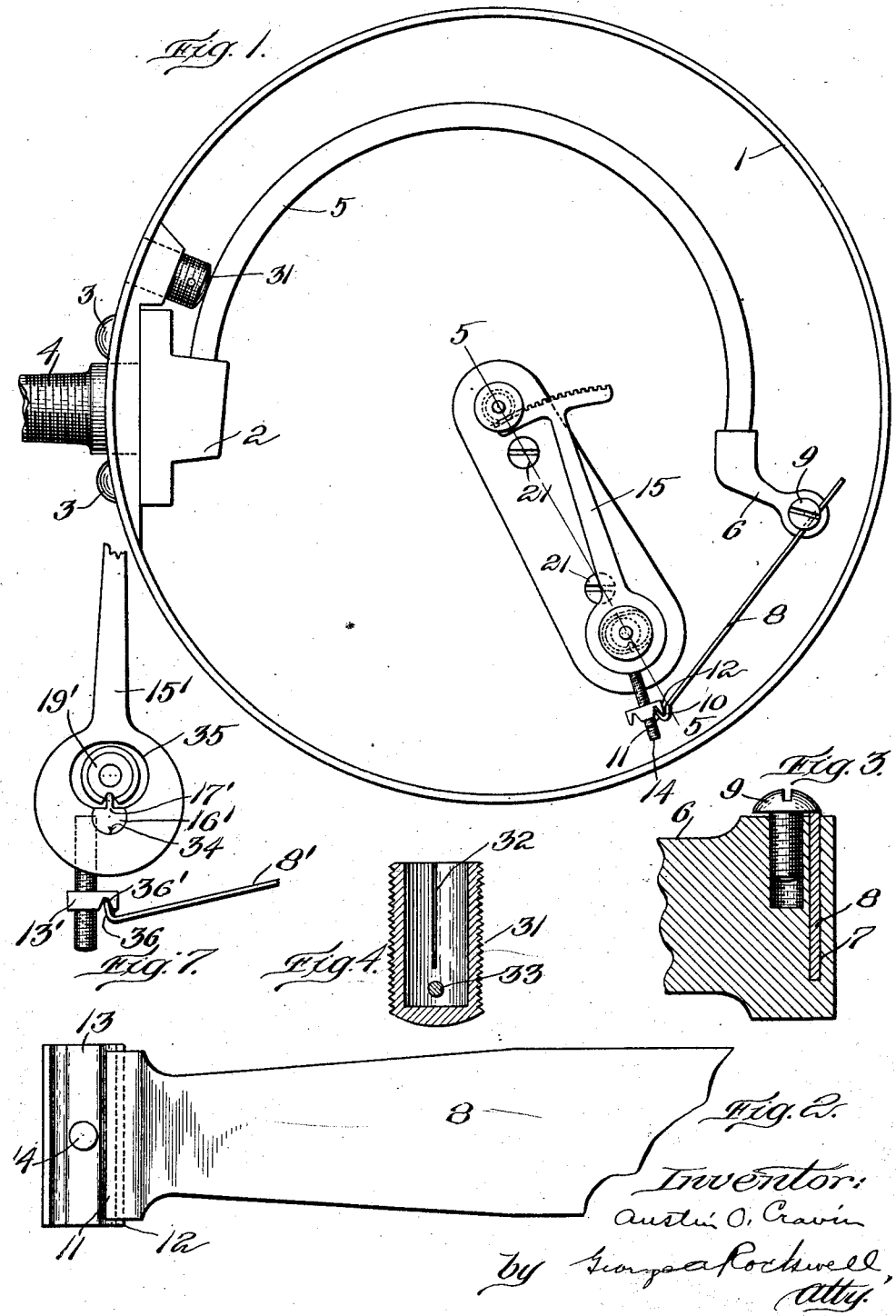

April 17, 1928.
A. O. CRAVIN
GAUGE
Filed Dec. 29, 1925
1,666,556
4 Sheets-Sheet 2
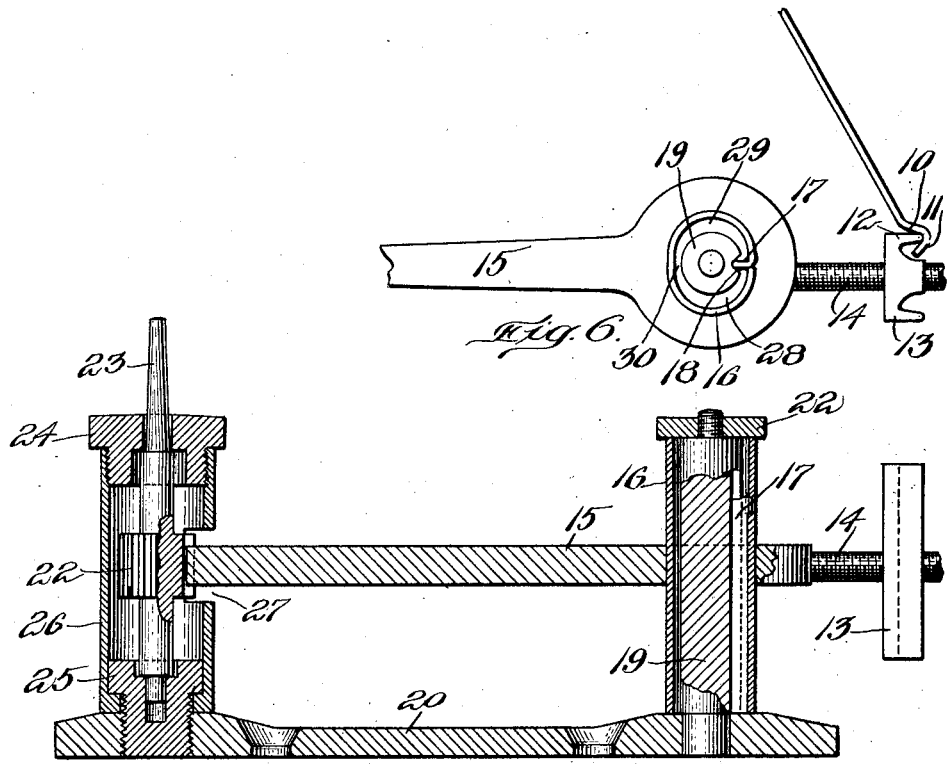

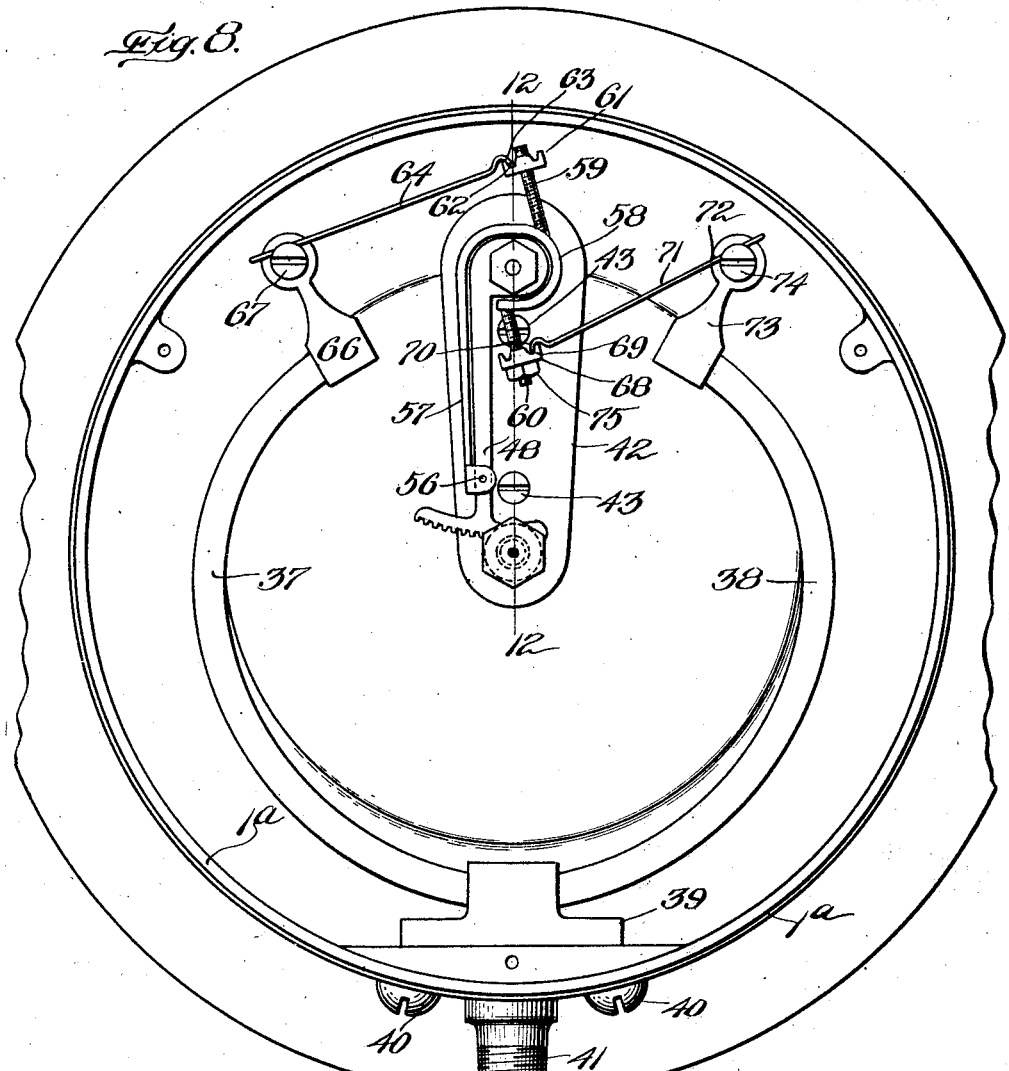
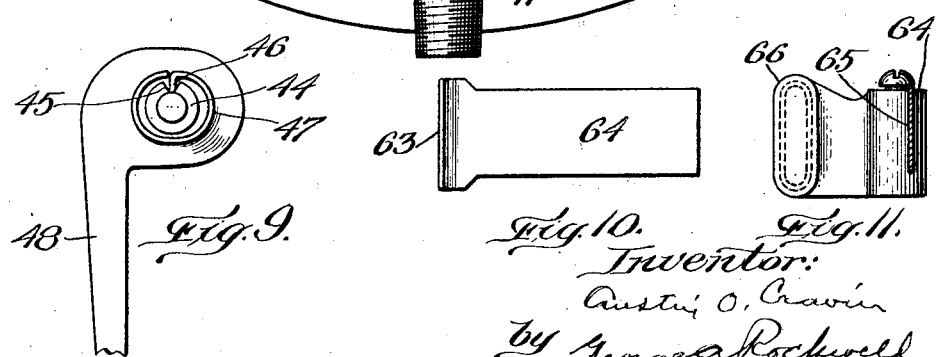

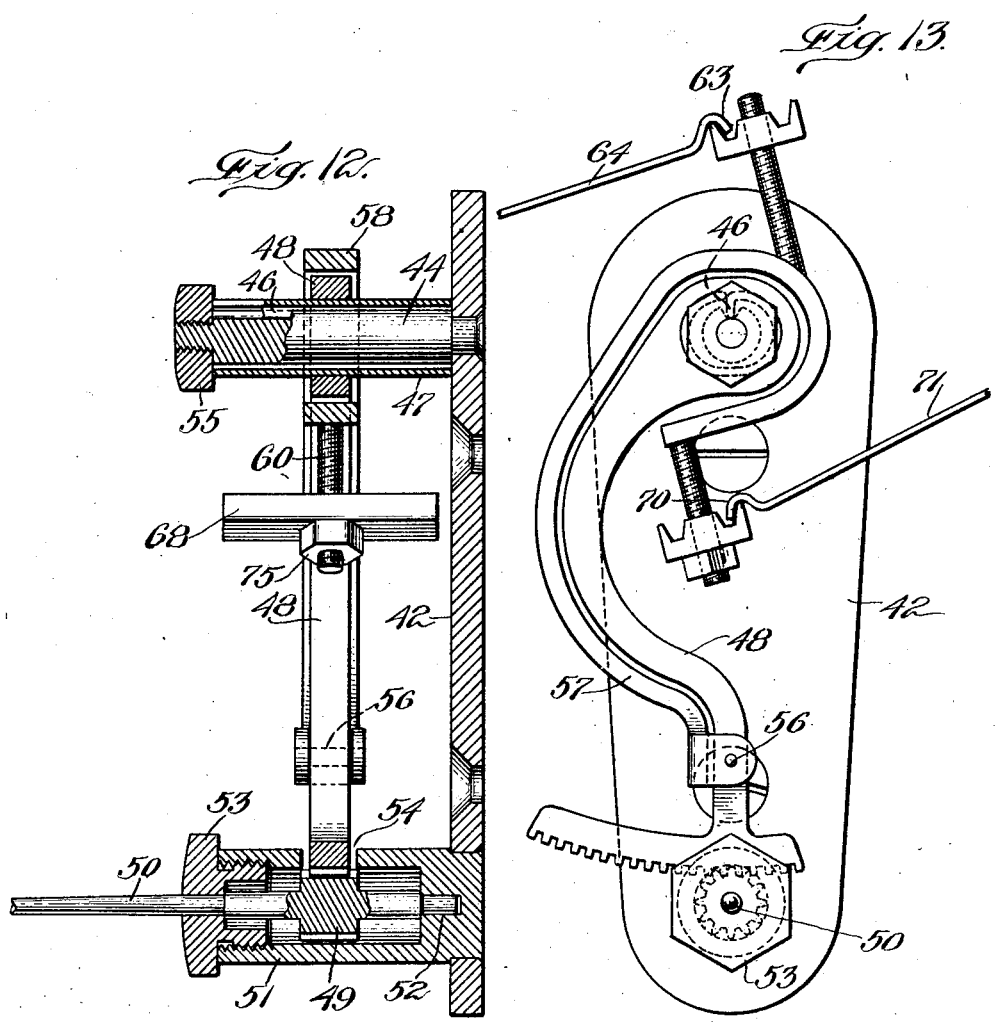

Patented Apr. 17, 1928.

1,666,556

UNITED STATES PATENT OFFICE.

AUSTIN O. CRAVIN, OF CHICAGO, ILLINOIS.

GAUGE.

Application filed December 29, 1925. Serial No. 78,083.

The principal object of my invention is to provide a gauge operated by pressure or vacuum or otherwise that is more reliable than any prior gauge, that will continue to register correctly for a very long period and that will not require frequent testing and repairing.

Other objects are to reduce friction and to make a more sensitive gauge.

Still other objects will be pointed out below.

A feature of my gauge is the absence of a hair spring heretofore used to take up the slack motion of some of the connecting parts.

Another feature is a pivotal connection which includes a knife blade edge.

Another feature is a one-link connection between the Bourdon tube and the sector.

In the accompanying drawings:

Figure 1 is a front view of a pressure gauge constructed in accordance with my invention and showing one form of the latter.

Figure 2 is an enlarged detail of a portion of one of the spring connectors and the abutment member engaged by it.

Figure 3 is a sectional detail of the terminal forming part of the free end of the Bourdon spring tube of the gauge shown in Fig. 1.

Figure 4 is a sectional detail of the tube adjusting abutment screw hereinafter described.

Figure 5 is an enlarged section on line 5—5 of Fig. 1, omitting the casing or housing.

Figure 6 is an enlarged detail of the hub portion of the sector of the gauge shown in Fig. 1 and some of the adjacent parts.

Figure 7 illustrates another form of sector and fulcrum post.

Figure 8 is a front view of another form of pressure gauge embodying my invention.

Figure 9 is an enlarged detail illustrating the construction of the hub portion of the sector shown in Fig. 8, and of the fulcrum pillar for said sector.

Figure 10 is an elevation of one of the spring connectors shown in Fig. 8.

Figure 11 is an elevation of the free end portion of one of the Bourdon spring tubes shown in Fig. 8.

Figure 12 is a section on line 12—12 of Fig. 8, but with the casing or housing omitted.

Figure 13 is a plan view, enlarged, of a modified form of movement for the type of gauge shown in Fig. 8.

Having reference to Figs. 1 to 7, inclusive, 1 represents the body portion of the usual housing of my improved pressure gauge. Within this housing is a socket 2 secured thereto by screws 3 and having a threaded extension 4 extending through the wall of the housing to the exterior of the latter, as usual. Socket 2 has secured to its one end of a Bourdon spring tube 5 whose free end is equipped with a terminal 6, Figs. 1 and 3, formed with a slot 7 within which the shank end portion of a sheet metal spring connector blade 8 is fastened, with provision for adjustment, by means of a screw 9. The opposite end portion of connector 8 is bent to provide a transverse groove 10 and a lip or blade 11, as shown particularly in Figs. 2 and 6. The groove 10 is occupied by a knife-blade 12 provided upon an abutment member 13, the latter being formed with a threaded hole through it, and being screwed on to a threaded stem 14 projecting from the hub of a sector 15. This hub of sector 15 includes as a rigid part thereof, a sheet metal tube 16 which is substantially elliptical in cross-section and is driven into a correspondingly shaped hole formed in the hub portion of sector 15. Upon its interior the tube 16 is made with a knife-blade 17 extending longitudinally from end to end thereof, and this knife-blade is seated within a groove 18 formed longitudinally upon one side of a pillar or fulcrum post 19, and always is held therein by the pressure of the spring connector 8. At its lower end the fulcrum post 19 is permanently secured to a plate 20 which, in turn, is secured to the housing 1 by screws 21. The tube 16 rests at its lower end upon the plate 20 and is held against upward displacement, without interference with rotary movement thereof, by a nut 22 screwed upon the upper reduced and threaded end portion of the fulcrum post.

The teeth of the sector 15, at the free end of the latter mesh with a pinion 22 provided upon the hand arbor 23 journaled in bushings 24 and 25. The bushing 25 is in the form of a screw occupying a threaded hole in the base plate 20 and serves also to clamp a hollow post 26 securely to said base plate. This hollow post 26 serves as a housing for the greater part of the hand arbor and for its pinion 22, being formed with an opening through its side as at 27 to permit of engagement of the sector with the pinion.

As will be clear from Fig. 6 the interior of the sleeve 16 is greater in size than the fulcrum post 19 so that the only place of engagement between the two is between the knife blade 17 of the sleeve and the bottom of the groove 18, sufficient clearance being provided at each side of the post, as at 28 and 29, to allow the sector to swing to the limit of its movement in either direction without interference between the sleeve 16 and the post. Also sufficient clearance is provided between the sleeve and post at the side of the latter opposite knife blade 17, as shown at 30, to avoid rubbing engagement between the sleeve and post.

Adjustably mounted in a threaded hole provided through the annular wall of the housing 1 (Figure 1) is an abutment screw 31 which bears against the outer side of the Bourdon spring tube 5 at a point close to the anchored or fixed end of the latter. By adjusting screw 31 the tube 5 may be flexed or shifted in either direction to set or reset the hand of the gauge, the resulting adjustment of the free end of tube 5 acting through the spring connector 8, sector 15 and pinion 22 to shift the hand when this adjustment is made.

In order to lock the screw 31 in adjusted position and prevent accidental displacement thereof, said screw is split as shown at 32, Fig. 4, and sprung outwardly so as to frictionally grip the wall of the threaded hole occupied by it. Also, the screw 31 is preferably made in the form of a thimble with its open end outermost and is provided near the inner end of its interior with a cross-bar 33 for engagement with a special tool or wrench by means of which the screw is operated.

In Fig. 7 I have shown a modified form of movement wherein the fulcrum knife blade 17' is formed upon a rod 16' driven into a pocket 34 formed through the hub portion of the sector 15'. This pocket 34 opens into a hole 35 formed through the hub of the sector for the fulcrum post 19'. Like the sleeve 16, the rod 16' is made of a length to extend upwardly to the nut 22, Fig. 5, and downwardly to the base plate 20, so that the sector is supported thereby at the proper height.

The gauge above described dispenses with the use of a delicate hair spring such as heretofore employed to take up the slack motion in the joints in order to effect a true indication of pressure, as the pressure of the spring connector 8 is in a direction to force all bearings together and to hold the sector in position relatively to the pinion so that there is no slack or lost motion either between the sector and its pinion; between the sector and its fulcrum post or between the sector and the free end of the Bourdon spring tube 5. The elimination of the hair spring referred to reduces the friction on the hand arbor bearings and cogs. Furthermore, the construction described provides a gauge that is very sensitive, has a steady hand, and one that will register correctly on low pressures without the presence of drag.

A gummy condition of the lubricant in the joints of gauges as heretofore constructed, or the presence of dust and dirt in certain places, may cause the hand to stick or drag, thus causing incorrect reading. This is impossible with my improved gauge as it is impossible for dust and dirt to lodge between the knife blades and their seats and a gummy condition of the lubricant, if used, will not interfere with the movement of the knife blades.

The screw 9 (Figure 3) permits of adjustment of the length of the connector 8 to accord with the relation of the free end of the Bourdon tube with the movement. Since the abutment member 13 (Figure 5) is free to adjust itself rotatively on the stem 14 it is therefore free to fit itself exactly parallel to the groove 10 of the connector 8 whatever be the position of the latter. Furthermore, by screwing the abutment member 13 toward or from the hub of the sector the throw of the hand, for a given movement of the tube 5, may be regulated or varied.

The construction illustrated in Fig. 7 is particularly adapted to those gauges where the movement extends downwardly from the hand arbor in which situation the fulcrum groove upon the post faces downward so that dust and dirt can not lodge therein. In connection with this form, as illustrated, it is to be noted that the spring connector 8' is made at its end with a knife blade 36 seated within a groove 36' provided upon the abutment member 13".

Figures 8 to 13, inclusive, of the drawings show a double spring gauge. In this form of my invention two Bourdon spring tubes 37 and 38 are provided, each having one end anchored to, and communicating with the interior of, a socket 39 fastened by screws 40 to the annular wall of the gauge housing 1ª, said socket being made with a threaded extension 41 extending through said wall to the exterior thereof.

The movement of this gauge includes a base plate 42 fastened by screws 43 to the bottom of the housing 1ª and to this base plate is fastened the lower end of a fulcrum post 44, formed along one side thereof with a groove 45, Figs. 9 and 12, in which is seated a knife blade 46 provided upon the interior of a sheet metal sleeve 47. Sleeve 47 is driven into a hole formed through the hub of a sector 48 whose teeth mesh with those of a pinion 49 on a hand arbor 50. The arbor 50 is disposed within a hollow post 51 fixed at one end to the base plate 42 and has its inner end journaled in a bearing 52 while its opposite end portion is rotatably supported by a bushing 53 screwed into the outer end of the hollow post. The post 51 is made with a side opening 54 through which the sector extends to engage the pinion 49. The outer end of the fulcrum post 44 is reduced and threaded to receive upon it a nut 55, and the sleeve 47 is made of a length to extend from said nut to the base plate 42 so that the sector is thereby supported in proper position with relation to the pinion 49.

Pivoted at 56 to the sector near its free end is a floating equalizing lever 57 which lays alongside of, but out of contact with, the sector, and this lever 57 is made with a hub portion 58 extending around the hub of the sector with considerable clearance space between the two. Hub 58 of lever 57 is made with two oppositely disposed substantially radial arms herein shown as two threaded stems 59 and 60. Upon the stem 59 is adjustably mounted an abutment member 61 formed with a groove 62 which provides a knife edge 63 at the outer side of the groove seated within a groove provided at one end of a spring connector blade 64, said connector blade being yieldingly pressed against the abutment member 63. The shank portion of connector 64 occupies a position within a slot 65, Fig. 11, formed in a terminal 66 secured to the free end of the tube 37, and is securely clamped therein with provision for adjustment by means of a screw 67. The abutment member 61 is formed at its middle with a threaded hole to receive the stem 59 and by rotation thereof its position with relation to the fulcrum blade 46 may be varied.

The stem 60 also has an abutment member 68 mounted thereon formed with a groove 69 which provides a knife edge at the outer side thereof which is seated within a groove provided at the free end of a spring connector blade 71. The shank portion of connector blade 71 occupies a position within a slot 72 provided in a terminal 73 secured to the free end of tube 38, and is adjustably clamped in said slot by means of a screw 74. The abutment member 68 is made with an unthreaded hole through it to receive the stem 60 and is held in position on the stem with provision for adjustment toward and from the fulcrum knife blade 46 by a nut 75. This method of connecting the abutment member 68 with its stem is resorted to for the reason that said member occupies a position so close to the sector 48 that it can not be rotated for the purpose of adjusting it as in the case of the abutment member 61. Figure 10 is a side elevation of one of the spring connectors showing the knife blade at one end thereof and each abutment member is of about the same length as its knife blade.

The floating compensating or equalizing lever 57, connected as described with the two tubes, is provided for the reason that said two tubes may not, and usually do not, exhibit the same characteristics under variations of pressure, and inaccurate indication would be the result of directly connecting the tubes with the sector through one tube opposing the other at times. With the construction described the lever 57 neutralizes the differing actions of the two tubes under variations of pressure since the hub portion thereof is free to shift laterally and centralize itself with respect to the two tube ends. Furthermore, this freedom of self adjustment of said hub portion prevents disengagement of the spring blades from the members 61 and 68.

A double spring tube gauge constructed and operating as described operates with much less drag than double tube gauges as heretofore constructed and is more sensitive on very low pressures than the single spring tube form.

Figure 13 shows a modified form of movement for the double spring tube gauge, this form of movement being substantially the same as that already described except that it is constructed so that normally the axis of hand arbor 50, pivot 56, knife blade 70, fulcrum knife blade 46 and knife blade 63, are in alinement, which is a somewhat better disposition of parts than in Fig. 8.

Among the advantages of my gauge I may point out that the knife blades, being slightly rounded at their edges, rock in their grooves with practically no friction; that the connectors, such as 8 (Figure 3), are clamped at their edges, and that the small clearance, as at 30 (Figure 6), prevents blade 17 from slipping out of groove 18 when the connector blade, such as 8, is released.

What I claim is:

1. A gauge comprising a sector; a member rotatably and adjustably mounted on said sector, the axis of rotation of said member extending substantially radially with reference to the pivot of the sector; resilient means operatively connected with said Bourdon spring and operatively connected with said adjustable member.

2. In a gauge the combination of a sector member and a fulcrum post member therefor, one of said members being formed with a groove and the other with a knife blade seated within said groove.

3. In a gauge the combination of a sector member and a fulcrum post member therefor, one of said members being formed with a groove and the other with a knife blade seated within said groove; means for holding said knife blade within said groove with provision for swinging movement of said sector.

4. In a gauge the combination of a sector member and a fulcrum post member therefor, one of said members being formed with a groove and the other with a knife blade seated within said groove; means for yieldingly holding said knife blade within said groove with provision for swinging movement of said sector.

5. A gauge comprising a sector; a member threaded on, and adjustable longitudinally of, the sector; a Bourdon tube; and a spring member directly connecting said Bourdon tube and said adjustable member and having a resilient pivotal connection with one of them.

6. A gauge comprising a Bourdon tube; a sector; a member mounted on, and adjustable longitudinally of, the sector; and a spring member directly connected to the Bourdon tube and having an operative connection with said adjustable member consisting of a knife blade on one of said members and a cooperating groove on the other.

7. A gauge comprising a Bourdon tube; a sector; a member mounted on, and rotatably adjustable longitudinally of, the sector; and a spring member directly connected to the Bourdon tube and having an operative connection with said adjustable member consisting of a knife blade on one of said members and a cooperating groove on the other.

8. A gauge comprising a Bourdon tube spring having a terminal with a slot; a sector; a resilient plate operatively connected to the sector and having a portion within said slot; and means engaging the edge of the plate to hold it adjustably in the desired fixed relation to the Bourdon spring.

9. A gauge comprising a sector; a member adjustably mounted on said sector, and movable radially of the sector for such adjustment; a Bourdon tube spring; and resilient means operatively connecting the spring and adjustable member and having a resilient pivotal connection with one of them.

10. A gauge comprising a Bourdon tube spring; a sector; a resilient member operatively connecting the sector and Bourdon spring and having a resilient pivotal connection with one of them; and means to adjustably hold the resilient member in the desired fixed relation to the other of said sector and spring.

11. A gauge comprising a Bourdon tube spring; a sector; a resilient plate operatively connected to said tube spring and to said sector; and means engaging the edge of said plate to hold it in the desired fixed relation to said spring or sector, said means being movable to permit adjustment of the plate.

12. In a gauge the combination of a fulcrum post having a groove; and a sector member having a knife blade seated within said groove.

13. A gauge comprising a Bourdon tube spring; a sector; a resilient member operatively connecting the spring and sector to actuate the latter when the pressure increases and when the pressure decreases, the connection of said resilient member with either the sector or tube spring consisting of a knife blade and cooperating groove, said knife blade extending, and the groove facing, in a direction which is substantially radial with reference to the pivot of the sector.

14. A gauge comprising a Bourdon tube spring; a sector; and a member connected with the Bourdon spring and having a knife blade to operatively engage said sector to actuate the latter when the pressure increases and when the pressure decreases, said knife blade extending in a direction which is substantially radial with reference to the pivot of the sector.

15. A gauge comprising a Bourdon tube spring; a sector provided with a groove, the latter facing in a direction which is substantially radial with reference to the pivot of the sector; and a resilient member connected with the Bourdon spring and having a knife blade edge to ride in said groove and actuate said sector when the pressure increases and when the pressure decreases.

16. A gauge comprising a Bourdon tube spring; a sector member; and a member connected with the Bourdon spring; said members having an operative connection consisting of a knife blade on one of them and a cooperating groove on the other to actuate the sector when the pressure increases and when the pressure decreases, the knife blade extending, and the groove facing, in a direction which is substantially radial with reference to the pivot of the sector.

AUSTIN O. CRAVIN.